United States Patent
Chen et al.

(10) Patent No.: US 10,785,165 B2
(45) Date of Patent: Sep. 22, 2020

(54) METHOD FOR CONTROLLING SERVICE DATA FLOW AND NETWORK DEVICE

(71) Applicant: Huawei Technologies Co., Ltd., Shenzhen (CN)

(72) Inventors: Guozhong Chen, Shenzhen (CN); Haibin Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 532 days.

(21) Appl. No.: 14/880,511

(22) Filed: Oct. 12, 2015

(65) Prior Publication Data
US 2016/0112344 A1    Apr. 21, 2016

(30) Foreign Application Priority Data
Oct. 15, 2014    (CN) .......................... 2014 1 0545651

(51) Int. Cl.
*H04L 12/927*    (2013.01)
*H04L 29/06*    (2006.01)
(Continued)

(52) U.S. Cl.
CPC ............. *H04L 47/80* (2013.01); *H04L 63/10* (2013.01); *H04L 45/50* (2013.01); *H04L 47/10* (2013.01); *H04L 47/20* (2013.01)

(58) Field of Classification Search
CPC ......... H04L 47/80; H04L 63/10; H04L 45/50; H04L 47/10; H04L 47/20
See application file for complete search history.

(56) References Cited

U.S. PATENT DOCUMENTS 6,377,577 B1    4/2002  Bechtolsheim et al.
7,010,582 B1*   3/2006  Cheng ................. H04L 63/0815
                                                    709/219
(Continued)

FOREIGN PATENT DOCUMENTS

CN    1674558 A    9/2005
CN    103905447 A    7/2014
(Continued)

OTHER PUBLICATIONS

Access Control Models and Security Labeling, Liu et al., Information Networks Division of Defense Science and Technology Organisation; Edinburgh, Australia (Year: 2007).*
(Continued)

*Primary Examiner* — Tonia L Dollinger
*Assistant Examiner* — Jihad K Boustany
(74) *Attorney, Agent, or Firm* — Conley Rose, P.C.

(57) ABSTRACT

A method for controlling a service data flow and a network device are provided. The method includes receiving, by a network device, a service data flow, and acquiring a control label that is carried, based on the Label Control Protocol, in the service data flow, and performing, by the network device, network access control on the service data flow according to the control label by using admission control configuration information and application control configuration information that are delivered by a controller and are based on security group information, where the network access control includes at least one of admission control and application control. According to the embodiments of the present disclosure, admission control and/or application control may be performed on the service data flow, so as to effectively improve efficiency of processing the service data flow by the network device.

20 Claims, 5 Drawing Sheets

(51) Int. Cl.
*H04L 12/723* (2013.01)
*H04L 12/801* (2013.01)
*H04L 12/813* (2013.01)

(56) References Cited

U.S. PATENT DOCUMENTS

| | | | | |
|---|---|---|---|---|
| 8,612,612 | B1* | 12/2013 | Dukes | H04L 67/14 |
| | | | | 370/230 |
| 8,891,549 | B1* | 11/2014 | Subramanian | H04L 45/302 |
| | | | | 370/463 |
| 2005/0213504 | A1 | 9/2005 | Enomoto et al. | |
| 2008/0313692 | A1* | 12/2008 | Yun | H04N 21/235 |
| | | | | 725/131 |
| 2009/0328186 | A1* | 12/2009 | Pollutro | G06F 21/31 |
| | | | | 726/13 |
| 2014/0071811 | A1* | 3/2014 | Niu | H04L 41/0893 |
| | | | | 370/221 |
| 2014/0269716 | A1* | 9/2014 | Pruss | H04L 45/38 |
| | | | | 370/392 |
| 2017/0019341 | A1 | 1/2017 | Huang et al. | |

FOREIGN PATENT DOCUMENTS

| | | |
|---|---|---|
| CN | 103944884 A | 7/2014 |
| EP | 2632082 A2 | 8/2013 |

OTHER PUBLICATIONS

Label-Based Access Control: An ABAC Model with Enumerated Authorization Policy; Biswas et al., ACM; New Orleans, LA, USA Year: (2016).*
Foreign Communication From a Counterpart Application, European Application No. 15179584.6, Extended European Search Report dated Nov. 24, 2015, 6 pages.
Machine Translation and Abstract of Chinese Publication No. CN103944884, dated Jul. 23, 2014, 7 pages.
Foreign Communication From a Counterpart Application, Chinese Application No. 201410545651.9, Chinese Office Action dated May 30, 2018, 5 pages.

* cited by examiner

METHOD FOR CONTROLLING SERVICE DATA FLOW AND NETWORK DEVICE

CROSS-REFERENCE TO RELATED APPLICATION

This application claims priority to Chinese Patent Application No. 201410545651.9, filed on Oct. 15, 2014, which is hereby incorporated by reference in its entirety.

TECHNICAL FIELD

Embodiments of the present disclosure relate to network technologies, and in particular, to a method for controlling a service data flow and a network device.

BACKGROUND

With quick development of new network technologies, mobile terminals are popularized rapidly, and mobile offices and wireless access also spring up accordingly. Any terminals are used to access a network anytime and anywhere, and have a same forwarding priority, network bandwidth, network access permission, and security policy after accessing the network in different places, which becomes a development trend of an enterprise network.

For this trend, that a network controller (Controller) component is added to a network, and centralized control is performed on user information in the entire network by using the controller is put forward based on a Software Defined Network (SDN) concept. The controller synchronizes security group information to execution point devices network-wide, the execution point devices include a switch, a firewall, and the like, and the security group information refers to information about a protected network resource or information about an end user. The user performs authentication, and gets online, and the execution point devices acquire security group information of service traffic, and perform admission control or application control on the service traffic. The admission control refers to protecting a network boundary, and controlling a terminal accessing a network, and the application control refers to protecting application traffic of a network boundary on the premise of admission, and controlling application traffic of a terminal accessing a network.

However, the execution point devices can perform only admission control or application control on service traffic, and in this way, efficiency of processing the service traffic by the execution point devices is low. Therefore, how to improve efficiency of processing the service traffic by the execution point devices is a technical problem needing to be urgently resolved nowadays.

SUMMARY

Embodiments of the present disclosure provide a method for controlling a service data flow and a network device, so as to resolve a problem of low efficiency of processing service traffic by an execution point device.

According to a first aspect, an embodiment of the present disclosure provides a method for controlling a service data flow, including receiving, by a network device, a service data flow, and acquiring a control label that is carried, based on the Label Control Protocol (LCP), in the service data flow, and performing, by the network device, network access control on the service data flow according to the control label by using admission control configuration information and application control configuration information that are delivered by a controller and are based on security group information, where the network access control includes at least one of admission control and application control.

With reference to the first aspect, in a first possible implementation manner of the first aspect, if the network device is a firewall device, the performing, by the network device, network access control on the service data flow according to the control label by using admission control configuration information and application control configuration information that are delivered by a controller and are based on security group information includes respectively performing, if the control label is first information, admission control and application control on the service data flow by using the admission control configuration information and the application control configuration information, where the first information is used for indicating that a receiver of the service data flow has not performed admission control or application control on the service data flow, performing, if the control label is second information, application control on the service data flow only by using the application control configuration information, where the second information is used for indicating that a receiver of the service data flow has completed admission control on the service data flow, but has not performed application control on the service data flow, performing, if the control label is third information, admission control on the service data flow only by using the admission control configuration information, where the third information is used for indicating that a receiver of the service data flow has completed application control on the service data flow, but has not performed admission control on the service data flow, or directly forwarding, if the control label is fourth information, the service data flow, where the fourth information is used for indicating that a receiver of the service data flow has completed admission control and application control on the service data flow.

With reference to the first possible implementation manner of the first aspect, in a second possible implementation manner of the first aspect, the method further includes after the respectively performing admission control and application control on the service data flow by using the admission control configuration information and the application control configuration information, updating the first information to the fourth information, and forwarding the service data flow, or after the performing application control on the service data flow only by using the application control configuration information, updating the second information to the fourth information, and forwarding the service data flow, or after the performing admission control on the service data flow only by using the admission control configuration information, updating the third information to the fourth information, and forwarding the service data flow, or during the directly forwarding the service data flow, keeping the fourth information unchanged.

With reference to the first aspect, the first possible implementation manner of the first aspect, or the second possible implementation manner of the first aspect, in a third possible implementation manner of the first aspect, the method further includes respectively performing, if it is determined and learned that the service data flow does not carry the control label, admission control and application control on the service data flow by using the admission control configuration information and the application control configuration information, and adding the control label to the service data flow, where a value of the control label is the fourth information, or performing, if it is determined and learned that the service data flow does not carry the control label, application control on the service data flow only by using the application control configuration information, and adding the control label to the service data flow, where a value of the control label is the third information, or performing, if it is determined and learned that the service data flow does not carry the control label, admission control on the service data flow only by using the admission control configuration information, and adding the control label to the service data flow, where a value of the control label is the second information.

With reference to the first aspect, in a fourth possible implementation manner of the first aspect, if the network device is a switching device, the performing, by the network device, network access control on the service data flow according to the control label by using admission control configuration information and application control configuration information that are delivered by a controller and are based on security group information includes performing, if the control label is first information, admission control on the service data flow by using the admission control configuration information, where the first information is used for indicating that a receiver of the service data flow has not performed admission control or application control on the service data flow, directly forwarding, if the control label is second information, the service data flow, where the second information is used for indicating that a receiver of the service data flow has completed admission control on the service data flow, but has not performed application control on the service data flow, performing, if the control label is third information, admission control on the service data flow by using the admission control configuration information, where the third information is used for indicating that a receiver of the service data flow has completed application control on the service data flow, but has not performed admission control on the service data flow, or directly forwarding, if the control label is fourth information, the service data flow, where the fourth information is used for indicating that a receiver of the service data flow has completed admission control and application control on the service data flow.

With reference to the fourth possible implementation manner of the first aspect, in a fifth possible implementation manner of the first aspect, the method further includes after the performing, if the control label is first information, admission control on the service data flow by using the admission control configuration information, updating the first information to the second information, and forwarding the service data flow, or during the directly forwarding, if the control label is second information, the service data flow, keeping the second information unchanged, or after the performing, if the control label is third information, admission control on the service data flow by using the admission control configuration information, updating the third information to the fourth information, and forwarding the service data flow, or during the directly forwarding, if the control label is fourth information, the service data flow, keeping the fourth information unchanged.

With reference to the fourth possible implementation manner of the first aspect or the fifth possible implementation manner of the first aspect, in a sixth possible implementation manner of the first aspect, the method further includes performing, if it is determined and learned that the service data flow does not carry the control label, admission control on the service data flow by using the admission control configuration information, and adding the control label to the service data flow, where a value of the control label is the second information.

According to a second aspect, an embodiment of the present disclosure provides a network device, including a receiving module configured to receive a service data flow, and acquire a control label that is carried, based on the LCP, in the service data flow, and a processing module configured to perform network access control on the service data flow according to the control label by using admission control configuration information and application control configuration information that are delivered by a controller and are based on security group information, where the network access control includes at least one of admission control and application control.

With reference to the second aspect, in a first possible implementation manner of the second aspect, if the network device is a firewall device, the processing module is configured to respectively perform, if the control label is first information, admission control and application control on the service data flow by using the admission control configuration information and the application control configuration information, where the first information is used for indicating that a receiver of the service data flow has not performed admission control or application control on the service data flow, perform, if the control label is second information, application control on the service data flow only by using the application control configuration information, where the second information is used for indicating that a receiver of the service data flow has completed admission control on the service data flow, but has not performed application control on the service data flow, perform, if the control label is third information, admission control on the service data flow only by using the admission control configuration information, where the third information is used for indicating that a receiver of the service data flow has completed application control on the service data flow, but has not performed admission control on the service data flow, or directly forward, if the control label is fourth information, the service data flow, where the fourth information is used for indicating that a receiver of the service data flow has completed admission control and application control on the service data flow.

With reference to the first possible implementation manner of the second aspect, in a second possible implementation manner of the second aspect, the network device further includes an update module, and the update module is configured to after the respectively performing admission control and application control on the service data flow by using the admission control configuration information and the application control configuration information, update the first information to the fourth information, and forward the service data flow, or after the performing application control on the service data flow only by using the application control configuration information, update the second information to the fourth information, and forward the service data flow, or after the performing admission control on the service data flow only by using the admission control configuration information, update the third information to the fourth information, and forward the service data flow, or during the directly forwarding the service data flow, keep the fourth information unchanged.

With reference to the second aspect, the first possible implementation manner of the second aspect, or the second possible implementation manner of the second aspect, in a third possible implementation manner of the second aspect, the network device further includes a determining module, and the determining module is configured to respectively perform, if it is determined and learned that the service data flow does not carry the control label, admission control and application control on the service data flow by using the admission control configuration information and the application control configuration information, and add the control label to the service data flow, where a value of the control label is the fourth information, or perform, if it is determined and learned that the service data flow does not carry the control label, application control on the service data flow only by using the application control configuration information, and add the control label to the service data flow, where a value of the control label is the third information, or perform, if it is determined and learned that the service data flow does not carry the control label, admission control on the service data flow only by using the admission control configuration information, and add the control label to the service data flow, where a value of the control label is the second information.

With reference to the second aspect, in a fourth possible implementation manner of the second aspect, if the network device is a switch, the processing module is configured to perform, if the control label is first information, admission control on the service data flow by using the admission control configuration information, where the first information is used for indicating that a receiver of the service data flow has not performed admission control or application control on the service data flow, directly forward, if the control label is second information, the service data flow, where the second information is used for indicating that a receiver of the service data flow has completed admission control on the service data flow, but has not performed application control on the service data flow, perform, if the control label is third information, admission control on the service data flow by using the admission control configuration information, where the third information is used for indicating that a receiver of the service data flow has completed application control on the service data flow, but has not performed admission control on the service data flow, or directly forward, if the control label is fourth information, the service data flow, where the fourth information is used for indicating that a receiver of the service data flow has completed admission control and application control on the service data flow.

With reference to the fourth possible implementation manner of the second aspect, in a fifth possible implementation manner of the second aspect, the network device further includes an update module, and the update module is configured to after the performing, if the control label is first information, admission control on the service data flow by using the admission control configuration information, update the first information to the second information, and forward the service data flow, or during the directly forwarding, if the control label is second information, the service data flow, keep the second information unchanged, or after the performing, if the control label is third information, admission control on the service data flow by using the admission control configuration information, update the third information to the fourth information, and forward the service data flow, or during the directly forwarding, if the control label is fourth information, the service data flow, keep the fourth information unchanged.

With reference to the fourth possible implementation manner of the second aspect or the fifth possible implementation manner of the second aspect, in a sixth possible implementation manner of the second aspect, the network device further includes a determining module, configured to perform, if it is determined and learned that the service data flow does not carry the control label, admission control on the service data flow by using the admission control configuration information, and add the control label to the service data flow, where a value of the control label is the second information.

According to the method for controlling a service data flow and the network device in the embodiments of the present disclosure, a service data flow is received, and a control label that is carried, based on the LCP, in the service data flow is acquired; admission control and/or application control is performed on the service data flow according to the control label by using admission control configuration information and application control configuration information that are delivered by a controller and are based on security group information, so as to perform admission control and/or application control on the service data flow, which therefore effectively improves efficiency of processing the service data flow by the network device.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
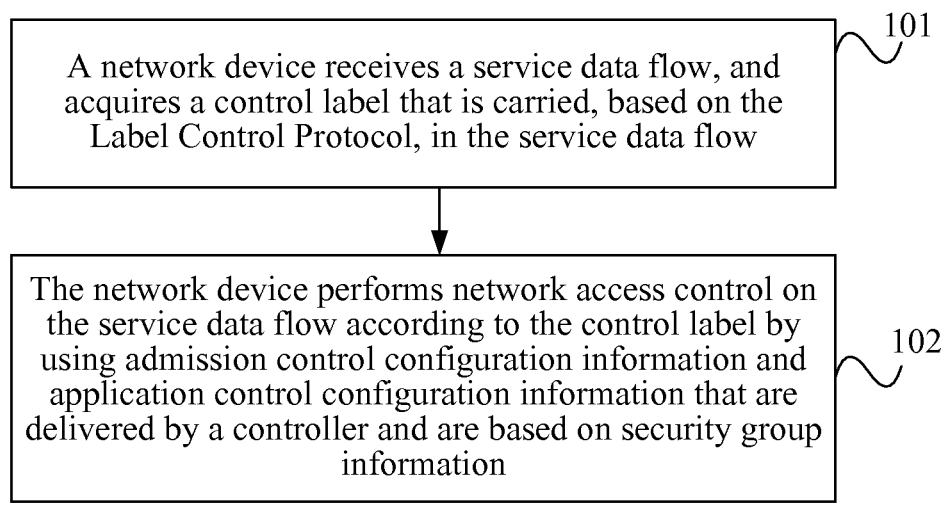
FIG. 1 is a flowchart of Embodiment 1 of a method for controlling a service data flow according to the present disclosure.

FIG. 1 is a flowchart of Embodiment 1 of a method for controlling a service data flow according to the present disclosure. As shown in FIG. 1, the method in this embodiment may include Step 101: A network device receives a service data flow, and acquires a control label that is carried, based on the LCP, in the service data flow.

The network device may be a network device such as a Next-generation Firewall (NGFW) or a switch that can provide application control and admission control for the service data flow. The service data flow includes a payload, a control label, and internet protocol (IP) information, the control label is information added to a service data flow based on the LCP, and the network device in this embodiment has functions of adding a control label and identifying a control label. The IP information in the service data flow includes a source IP address, a destination IP address, and some other IP layer information, the network device may acquire security group information corresponding to the service data flow, the security group information refers to information about a protected network resource or information about an end user, and the security group information includes source security group information and destination security group information, where the source security group information represents information about an end user needing to access a protected network resource, and the destination security group information represents information about a protected network resource providing a service. These network resources have fixed IP addresses, and an administrator requires that an end user is not allowed to access these protected resources until the identity of the end user is authenticated and authorization is obtained. For a specific obtaining manner, refer to a manner of obtaining security group information of a service data flow, which may be that: a controller performs centralized control on user information in a network, a user sends an authentication request to the controller by using a network device, the controller acquires, according to the authentication request, source security group information corresponding to an authentication information flow, and returns the source security group information to the network device, and the network device acquires the destination security group information of the service data flow according to a destination IP address of the service data flow, so as to acquire the security group information corresponding to the service data flow.

Step 102: The network device performs network access control on the service data flow according to the control label by using admission control configuration information and application control configuration information that are delivered by a controller and are based on security group information.

The network access control includes at least one of admission control and application control. The admission control refers to protecting a network boundary, and controlling a terminal accessing a network, that is, performing corresponding control processing on the service data flow according to the security group information of the service data flow. The application control refers to protecting application traffic of a network boundary on the premise of admission, and controlling application traffic of a terminal accessing a network, that is, performing corresponding control processing on the service data flow according to data flow related information and the security group information of the service data flow, where the data flow related information may be information such as a length of the service data flow.

The controller delivers the admission control configuration information and the application control configuration information that are based on the security group information to network devices, the network devices may perform admission control, application control, or admission control first and then application control on the service data flow according to the security group information of the service data flow and the admission control configuration information and the application control configuration information that are based on the security group information.

Optionally, if the network device is a firewall device, a specific implementation manner of step 102 may be respectively performing, if the control label is first information, admission control and application control on the service data flow by using the admission control configuration information and the application control configuration information, where the first information is used for indicating that a receiver of the service data flow has not performed admission control or application control on the service data flow; herein, the respectively performing admission control and application control on the service data flow refers to: first performing admission control on the service data flow by using the admission control configuration information, and then performing application control on the service data flow by using the application control configuration information, performing, if the control label is second information, application control on the service data flow only by using the application control configuration information, where the second information is used for indicating that a receiver of the service data flow has completed admission control on the service data flow, but has not performed application control on the service data flow, performing, if the control label is third information, admission control on the service data flow only by using the admission control configuration information, where the third information is used for indicating that a receiver of the service data flow has completed application control on the service data flow, but has not performed admission control on the service data flow, or directly forwarding, if the control label is fourth information, the service data flow, where the fourth information is used for indicating that a receiver of the service data flow has completed admission control and application control on the service data flow.

Further, if the network device is a firewall device, the method for controlling a service data flow in this embodiment may further include the following steps after the respectively performing admission control and application control on the service data flow by using the admission control configuration information and the application control configuration information in step 102 is performed, updating the first information of the service data flow to the fourth information, and forwarding the service data flow, or after the performing application control on the service data flow only by using the application control configuration information in step 102 is performed, updating the second information of the service data flow to the fourth information, and forwarding the service data flow, or after the performing admission control on the service data flow only by using the admission control configuration information in step 102 is performed, updating the third information of the service data flow to the fourth information, and forwarding the service data flow, or when the directly forwarding the service data flow in step 102 is performed, keeping the fourth information of the service data flow unchanged.

Optionally, if the network device is a firewall device, correspondingly, if it is determined and learned that the service data flow does not carry the control label, admission control and application control are respectively performed on the service data flow by using the admission control configuration information and the application control configuration information, and the control label is added to the service data flow, where a value of the control label is the fourth information, or if it is determined and learned that the service data flow does not carry the control label, application control is performed on the service data flow only by using the application control configuration information, and the control label is added to the service data flow, where a value of the control label is the third information, or if it is determined and learned that the service data flow does not carry the control label, admission control is performed on the service data flow only by using the admission control configuration information, and the control label is added to the service data flow, where a value of the control label is the second information.

Optionally, if the network device is a switching device, step 102 may be performing, if the control label is first information, admission control on the service data flow by using the admission control configuration information, where the first information is used for indicating that a receiver of the service data flow has not performed admission control or application control on the service data flow, directly forwarding, if the control label is second information, the service data flow, where the second information is used for indicating that a receiver of the service data flow has completed admission control on the service data flow, but has not performed application control on the service data flow, performing, if the control label is third information, admission control on the service data flow by using the admission control configuration information, where the third information is used for indicating that a receiver of the service data flow has completed application control on the service data flow, but has not performed admission control on the service data flow, or directly forwarding, if the control label is fourth information, the service data flow, where the fourth information is used for indicating that a receiver of the service data flow has completed admission control and application control on the service data flow.

Further, if the network device is a switching device, the method for controlling a service data flow in this embodiment may further include after the performing, if the control label is first information, admission control on the service data flow by using the admission control configuration information, updating the first information to the second information, and forwarding the service data flow, or during the directly forwarding, if the control label is second information, the service data flow, keeping the second information unchanged, or after the performing, if the control label is third information, admission control on the service data flow by using the admission control configuration information, updating the third information to the fourth information, and forwarding the service data flow, or during the directly forwarding, if the control label is fourth information, the service data flow, keeping the fourth information unchanged.

Optionally, if the network device is a switching device, if it is determined and learned that the service data flow does not carry the control label, admission control is performed on the service data flow by using the admission control configuration information, and the control label is added to the service data flow, where a value of the control label is the second information.

In this embodiment, a network device receives a service data flow, and acquires a control label that is carried, based on the LCP, in the service data flow; and performs network access control on the service data flow according to the control label by using admission control configuration information and application control configuration information that are delivered by a controller and are based on security group information, where the network access control includes admission control and/or application control, so as to perform admission control and/or application control on the service data flow, which therefore effectively improves efficiency of processing the service data flow by the network device.

The technical solution of the method embodiment shown in FIG. 1 is described below in detail by using two specific embodiments.

Figure 2:
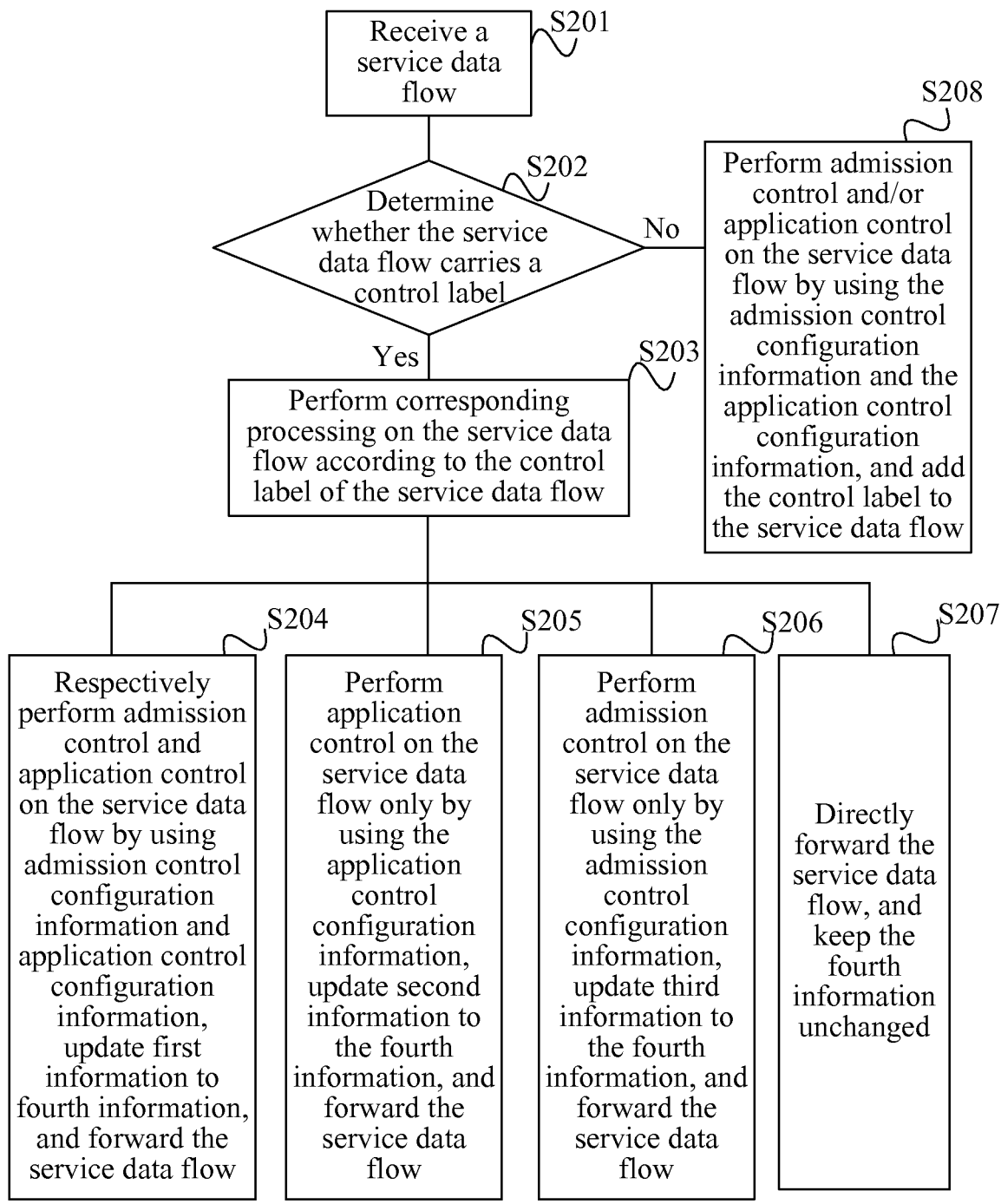
FIG. 2 is a flowchart of Embodiment 2 of a method for controlling a service data flow according to the present disclosure.
Figure 3:
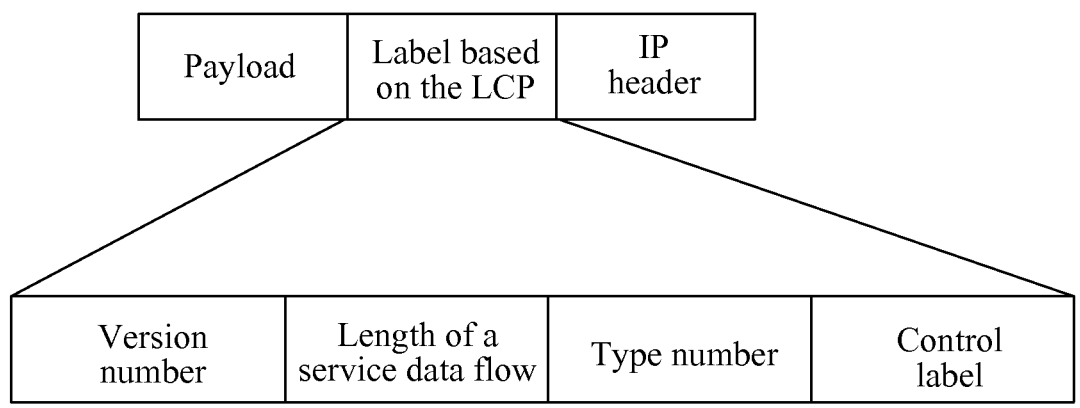
FIG. 3 is a schematic diagram of a specific form of a service data flow according to the present disclosure.

FIG. 2 is a flowchart of Method 2 for controlling a service data flow according to the present disclosure. FIG. 3 is a schematic diagram of a specific form of a service data flow according to the present disclosure. Description is made by using an example in which this embodiment is executed by an NGFW. As shown in FIG. 2, the method in this embodiment may include S201: Receive a service data flow.

The service data flow may be a packet. The service data flow may be a service data flow (not carrying a control label), or may be a service data flow (carrying a control label) based on the LCP in the present disclosure. A specific form of the service data flow based on the LCP may be shown in FIG. 3, and the service data flow includes a payload, a label based on the LCP, and an IP header. The label based on the LCP may include a protocol version number (Version), a length of a service data flow (Length), type information (Type), and a control label (Flag). The protocol version number (Version) is used for identifying protocol version information, which is convenient for protocol extension. The type information is used for identifying a protocol type, for example, this embodiment is based on the LCP protocol, and in the type information, Type=01 may be used for indicating the LCP protocol. The control label is used for indicating control information about whether corresponding control processing is performed on the service data flow, and values of the control label are classified into four types. When the control label is first information, the first information is indicated by using Flag=0, and is used for indicating that a receiver of the service data flow has not performed admission control or application control on the service data flow. When the control label is second information, the second information is indicated by using Flag=1, and is used for indicating that a receiver of the service data flow has completed admission control on the service data flow, but has not performed application control on the service data flow. When the control label is third information, the third information is indicated by using Flag=2, and is used for indicating that a receiver of the service data flow has completed application control on the service data flow, but has not performed admission control on the service data flow. When the control label is fourth information, the fourth information is indicated by using Flag=3, and is used for indicating that a receiver of the service data flow has completed admission control and application control on the service data flow.

S202: Determine whether the service data flow carries a control label, and if yes, perform S203; otherwise, perform S208.

The NGFW has functions of adding a label and identifying a label. When the NGFW identifies that the service data flow carries the control label, S203 is performed; when the NGFW identifies that the service data flow does not carry the control label, S208 is performed.

S203: Perform corresponding processing on the service data flow according to the control label of the service data flow.

if the control label is the first information, S204 is performed. If the control label is the second information, S205 is performed. If the control label is the third information, S206 is performed. If the control label is the fourth information, S207 is performed.

The NGFW performs corresponding processing on the service data flow according to the control label of the service data flow by using admission control configuration information and application control configuration information that are delivered by a controller and are based on security group information. A specific form of the admission control configuration information based on the security group information may be shown in Table 1, and a specific form of the application control configuration information based on the security group information may be shown in Table 2. Row attributes in Table 1 and Table 2 are used for indicating source security group information, and the source security group information represents information about an end user needing to access a protected network resource. Herein, description is made exemplarily by using research and development A, outsourcing B, and unknown 0 as an example. Column attributes are used for indicating destination security group information, and the destination security group information represents information about a protected network resource providing a service. These network resources have fixed IP addresses, and an administrator requires that an end user is not allowed to access these protected resources until the identity of the end user is authenticated and authorization is obtained. Herein, description is made exemplarily by using voice C, code D, and a general WEB website as an example. It can be understood that research and development A, outsourcing B, and unknown 0 may also be used as the destination security group information, for example, research and development A needs to access a network resource of outsourcing B. In this case, the source security group information is research and development A, and the destination security group information is outsourcing B. For a manner of obtaining the security group information of the service data flow, refer to step 101. Admission control information and application control information corresponding to the service data flow may be acquired, according to the security group information of the service flow, from the admission control configuration information and the application control configuration information that are based on the security group information, for example, the source security group information is outsourcing B, the destination security group information is voice C. It may be learned according to an admission control configuration matrix in Table 1 that, admission control is allowed, indicating that outsourcing B is allowed to perform a voice C operation, the source security group information is outsourcing B, and the destination security group information is a general WEB website.

It may be learned according to an application control configuration matrix in Table 2 that, application control is that a file is allowed or forbidden to be uploaded, indicating that outsourcing B is allowed to access a general WEB website, but is forbidden to upload a file.

TABLE 1

| Admission control configuration information based on security group information | | | | | | |
|---|---|---|---|---|---|---|
| | Research and development A | Outsourcing B | Unknown 0 | Voice C | Code D | Public network G | Any |
| Research and development A | — | Forbid | | | | | Allow |
| Outsourcing B | | — | | Allow | | Allow | Forbid |
| Unknown 0 | | | — | Forbid | Forbid | Forbid | Allow |

TABLE 2

| Application control configuration information based on security group information | | | | |
|---|---|---|---|---|
| | General WEB website | P2P | Social media | Another Internet application |
| Unauthenticated user | Allow URL filtering policy: only allowing to access a few websites | Forbid | Forbid | Forbid |
| Research and development A | Allow Forbid uploading a file | Forbid | Forbid | Allow Forbid uploading a file |
| outsourcing B | Allow Forbid uploading a file | Forbid | Forbid | Forbid |
| Unknown 0 | Forbid | Forbid | Forbid | Forbid |

S204: Respectively perform admission control and application control on the service data flow by using admission control configuration information and application control configuration information, update first information to fourth information, and forward the service data flow.

S205: Perform application control on the service data flow only by using the application control configuration information, update second information to the fourth information, and forward the service data flow.

S206: Perform admission control on the service data flow only by using the admission control configuration information, update third information to the fourth information, and forward the service data flow.

S207: Directly forward the service data flow, and keep the fourth information unchanged.

S208: Perform admission control and/or application control on the service data flow by using the admission control configuration information and the application control configuration information, and add the control label to the service data flow.

Admission control and application control are respectively performed on the service data flow by using the admission control configuration information and the application control configuration information, and the control label is added to the service data flow, where a value of the control label is the fourth information, or application control is performed on the service data flow only by using the application control configuration information, and the control label is added to the service data flow, where a value of the control label is the third information, or admission control is performed on the service data flow only by using the admission control configuration information, and the control label is added to the service data flow, where a value of the control label is the second information.

In this embodiment, a service data flow is received, whether the service data flow carries a control label is determined, and when the service data flow carries the control label, corresponding control processing is performed on the service data flow according to the control label of the service data flow by using admission control configuration information and application control configuration information that are delivered by a controller and are based on security group information, the control label of the service data flow on which admission control and/or application control processing is performed is updated; when the service data flow does not carry the control label, after corresponding control processing is performed on the service data flow, the control label is added to the processed service data flow, so as to perform admission control and/or application control on the service data flow. Moreover, when the service data flow passes through a next network device, corresponding control processing is performed on the service data flow according to the updated control label of the service data flow, avoiding repeatedly performing the same control processing, which therefore effectively improves efficiency of processing the service data flow.

Figure 4:
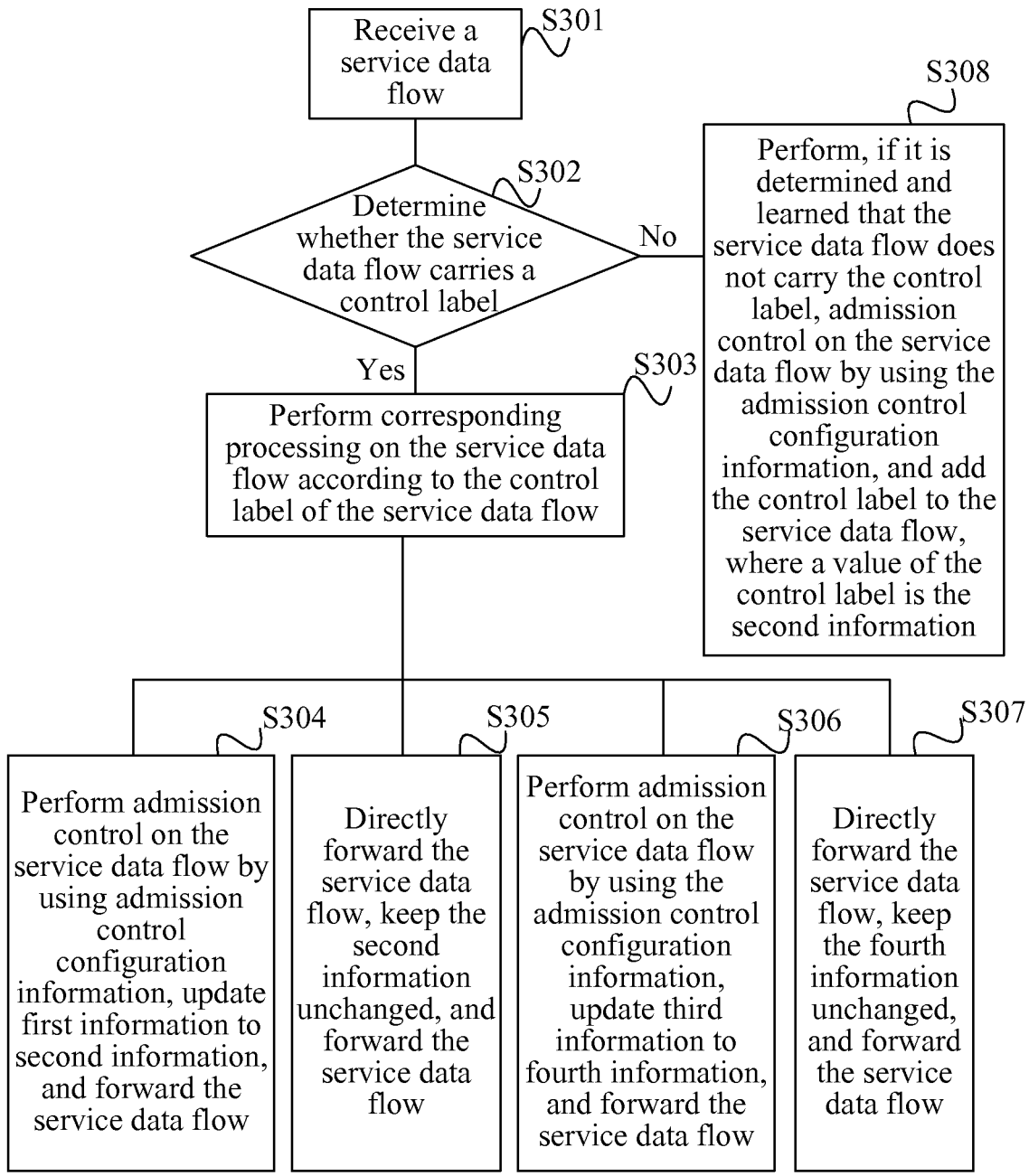
FIG. 4 is a flowchart of Embodiment 3 of a method for controlling a service data flow according to the present disclosure.

FIG. 4 is a flowchart of Embodiment 3 of a method for controlling a service data flow according to the present disclosure. Description is made by using an example in which this embodiment is executed by a switch. As shown in FIG. 4, the method in this embodiment may include S301: Receive a service data flow.

For a specific implementation manner, refer to S201.

S302: Determine whether the service data flow carries a control label, and if yes, perform S303; otherwise, perform S308.

The switch has functions of adding a label and identifying a label. When the switch identifies that the service data flow carries the control label, S303 is performed. When the switch identifies that the service data flow does not carry the control label, S308 is performed.

S303: Perform corresponding processing on the service data flow according to the control label of the service data flow.

If the control label is first information, S304 is performed. If the control label is second information, S305 is performed. If the control label is third information, S306 is performed. If the control label is fourth information, S307 is performed.

The switch receives admission control configuration information and application control configuration information that are delivered by a controller and are based on security group information. However, the switch performs admission control on the service data flow only by using the admission control configuration information based on the security group information. For a specific form of the admission control configuration information based on the security group information, refer to Table 1.

S304: Perform admission control on the service data flow by using admission control configuration information, update first information to second information, and forward the service data flow.

S305: Directly forward the service data flow, keep the second information unchanged, and forward the service data flow.

S306: Perform admission control on the service data flow by using the admission control configuration information, update third information to fourth information, and forward the service data flow.

S307: Directly forward the service data flow, keep the fourth information unchanged, and forward the service data flow.

S308: Perform, if it is determined and learned that the service data flow does not carry the control label, admission control on the service data flow by using the admission control configuration information, and add the control label to the service data flow, where a value of the control label is the second information.

In this embodiment, a service data flow is received, whether the service data flow carries a control label is determined, and when the service data flow carries the control label, corresponding admission control processing is performed on the service data flow according to the control label of the service data flow by using admission control configuration information and application control configuration information that are delivered by a controller and are based on security group information, the control label of the service data flow on which admission control processing is performed is updated; when the service data flow does not carry the control label, after corresponding admission control processing is performed on the service data flow, the control label is added to the processed service data flow, so as to perform admission control on the service data flow. Moreover, when the service data flow passes through a next network device, corresponding control processing is performed on the service data flow according to the updated control label of the service data flow, avoiding repeatedly performing the same control processing, which therefore effectively improves efficiency of processing the service data flow.

It should be noted that, in a situation in which a networking scenario is that admission control and application control are performed by using an NGFW and a switch, admission control and application control may be performed on the service data flow by using the method for controlling a service data flow in the embodiments shown in FIG. 1 to FIG. 4 in the present disclosure.

Figure 5:
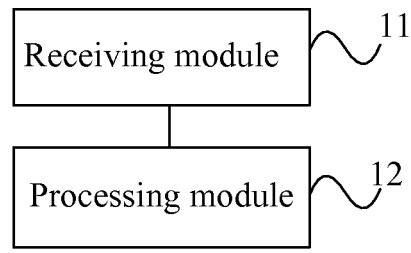
FIG. 5 is a schematic structural diagram of Embodiment 1 of a network device according to the present disclosure.

FIG. 5 is a schematic structural diagram of Embodiment 1 of a network device according to the present disclosure. As shown in FIG. 5, the network device in this embodiment may include: a receiving module 11 and a processing module 12. The receiving module 11 is configured to receive a service data flow, and acquire a control label that is carried, based on the LCP, in the service data flow. The processing module 12 is configured to perform network access control on the service data flow according to the control label by using admission control configuration information and application control configuration information that are delivered by a controller and are based on security group information, where the network access control includes at least one of admission control and application control.

Optionally, if the network device is a firewall device, the processing module 12 may be configured to: simultaneously perform, if the control label is first information, admission control and application control on the service data flow by using the admission control configuration information and the application control configuration information, where the first information is used for indicating that a receiver of the service data flow has not performed admission control or application control on the service data flow; perform, if the control label is second information, application control on the service data flow only by using the application control configuration information, where the second information is used for indicating that a receiver of the service data flow has completed admission control on the service data flow, but has not performed application control on the service data flow; perform, if the control label is third information, admission control on the service data flow only by using the admission control configuration information, where the third information is used for indicating that a receiver of the service data flow has completed application control on the service data flow, but has not performed admission control on the service data flow; or directly forward, if the control label is fourth information, the service data flow, where the fourth information is used for indicating that a receiver of the service data flow has completed admission control and application control on the service data flow.

Optionally, if the network device is a switching device, the processing module 12 may be configured to: perform, if the control label is first information, admission control on the service data flow by using the admission control configuration information, where the first information is used for indicating that a receiver of the service data flow has not performed admission control or application control on the service data flow; directly forward, if the control label is second information, the service data flow, where the second information is used for indicating that a receiver of the service data flow has completed admission control on the service data flow, but has not performed application control on the service data flow; perform, if the control label is third information, admission control on the service data flow by using the admission control configuration information, where the third information is used for indicating that a receiver of the service data flow has completed application control on the service data flow, but has not performed admission control on the service data flow; or directly forward, if the control label is fourth information, the service data flow, where the fourth information is used for indicating that a receiver of the service data flow has completed admission control and application control on the service data flow.

The apparatus in this embodiment may be configured to perform the technical solution of the method embodiment shown in FIG. 1, of which implementation principles and technical effects are similar, and details are not described herein again.

Figure 6:
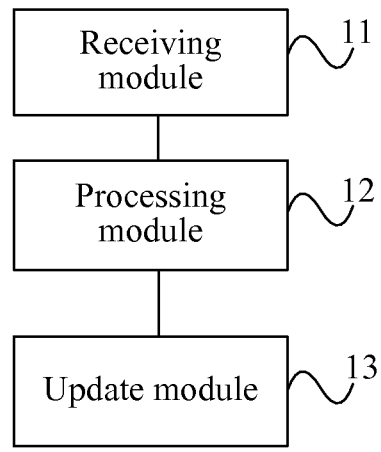
FIG. 6 is a schematic structural diagram of Embodiment 2 of a network device according to the present disclosure.

FIG. 6 is a schematic structural diagram of Embodiment 2 of a network device according to the present disclosure. As shown in FIG. 6, based on the structure of the network device shown in FIG. 5, the network device in this embodiment may further include: an update module 13. If the network device is a firewall device, the update module 13 is configured to: after the simultaneously performing admission control and application control on the service data flow by using the admission control configuration information and the application control configuration information, update the first information to the fourth information, and forward the service data flow; or after the performing application control on the service data flow only by using the application control configuration information, update the second information to the fourth information, and forward the service data flow; or after the performing admission control on the service data flow only by using the admission control configuration information, update the third information to the fourth information, and forward the service data flow; or during the directly forwarding the service data flow, keep the fourth information unchanged. If the network device is a switching device, the update module 13 is configured to: after the performing, if the control label is first information, admission control on the service data flow by using the admission control configuration information, update the first information to the second information, and forward the service data flow; or during the directly forwarding, if the control label is second information, the service data flow, keep the second information unchanged; or after the performing, if the control label is third information, admission control on the service data flow by using the admission control configuration information, update the third information to the fourth information, and forward the service data flow; or during the directly forwarding, if the control label is fourth information, the service data flow, keep the fourth information unchanged.

The network device in this embodiment may be configured to perform the technical solutions of the method embodiments shown in FIG. 2 and FIG. 4, of which implementation principles and technical effects are similar, and details are not described herein again.

Figure 7:
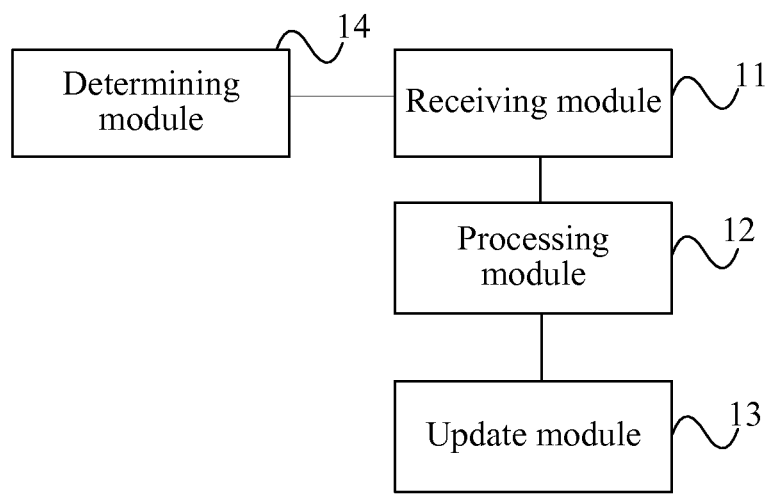
FIG. 7 is a schematic structural diagram of Embodiment 3 of a network device according to the present disclosure.

FIG. 7 is a schematic structural diagram of Embodiment 3 of a network device according to the present disclosure. As shown in FIG. 7, based on the structure of the apparatus shown in FIG. 5 or FIG. 6, the network device in this embodiment may further include: a determining module 14. If the network device is a firewall device, the determining module 14 is configured to: simultaneously perform, if it is determined and learned that the service data flow does not carry the control label, admission control and application control on the service data flow by using the admission control configuration information and the application control configuration information, and add the control label to the service data flow, where a value of the control label is the fourth information; or perform, if it is determined and learned that the service data flow does not carry the control label, application control on the service data flow only by using the application control configuration information, and add the control label to the service data flow, where a value of the control label is the third information; or perform, if it is determined and learned that the service data flow does not carry the control label, admission control on the service data flow only by using the admission control configuration information, and add the control label to the service data flow, where a value of the control label is the second information. If the network device is a switching device, the determining module 14 is configured to: perform, if it is determined and learned that the service data flow does not carry the control label, admission control on the service data flow by using the admission control configuration information, and add the control label to the service data flow, where a value of the control label is the second information.

The network device in this embodiment may be configured to perform the technical solutions of the method embodiments shown in FIG. 2 and FIG. 4, of which implementation principles and technical effects are similar, and details are not described herein again.

A person of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a read-only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method for controlling a service data flow in a network implemented by a network device, wherein the network comprises a controller and the network device, and wherein the method comprises:
receiving the service data flow, wherein the service data flow comprises a payload, a label based on a Label Control Protocol (LCP), and an internet protocol (IP) header, and wherein the label comprises a protocol version number, a length of the service data flow, type information for identifying a protocol type, and a control label, wherein the protocol version number and the protocol type indicate the LCP protocol;
acquiring the control label carried in the service data flow, wherein the control label indicates whether to apply admission control on the service data flow and application control on the service data flow; and
performing, according to the control label, network access control on the service data flow using an admission control configuration information and an application control configuration information, wherein the admission control configuration information and the application control configuration information are received from the controller and are based on security group information, wherein the security group information comprises information about an end user accessing a protected network resource, wherein performing the network access control comprises selectively applying at least one of the admission control or the application control, wherein the admission control controls access by a terminal to the network based on a value of the control label, and wherein the application control controls access by an application on the terminal to the network based on the value of the control label.

2. The method of claim 1, wherein the network device is a firewall device, and wherein performing the network access control on the service data flow according to the control label comprises performing the admission control and the application control, respectively, on the service data flow using the admission control configuration information and the application control configuration information when the control label is first information, and wherein the first information indicates that a receiver of the service data flow has not performed the admission control and the application control on the service data flow.

3. The method of claim 2, further comprising:
updating the first information to fourth information after performing the admission control and the application control, respectively, on the service data flow using the admission control configuration information and the application control configuration information; and
forwarding the service data flow to a destination.

4. The method of claim 1, wherein the network device is a switching device, and wherein performing the network access control on the service data flow comprises:
performing the admission control on the service data flow using the admission control configuration information when the control label is first information, wherein the first information indicates that a receiver of the service data flow has not performed the admission control or the application control on the service data flow;
updating the first information to second information after performing the admission control on the service data flow; and
forwarding the service data flow to a destination.

5. The method of claim 1, wherein the network device is a switching device, and wherein performing the network access control on the service data flow comprises:
forwarding the service data flow directly to a destination when the control label is fourth information, wherein the fourth information indicates that the receiver of the service data flow has completed the admission control and the application control on the service data flow; and
keeping the fourth information unchanged during forwarding the service data flow directly to the destination when the control label is the fourth information.

6. A network device for use in a network, wherein the network comprises a controller and the network device, and wherein the network device comprises:
a receiver configured to:
receive a service data flow comprising a payload, a label based on a Label Control Protocol (LCP), and an internet protocol (IP) header, wherein the label comprises a protocol version number, a length of the service data flow, type information for identifying a protocol type, and a control label, wherein the protocol version number and the protocol type indicate the LCP protocol; and
acquire the control label carried in the service data flow, wherein the control label indicates whether to apply admission control on the service data flow and application control on the service data flow; and
a processor coupled to the receiver and configured to:
perform, according to the control label, network access control on the service data flow using admission control configuration information and application control configuration information, wherein the admission control configuration information and the application control configuration information are received from a controller and are based on security group information, wherein the security group information comprises information about an end user accessing a protected network resource, wherein performing the network access control comprises selectively applying at least one of the admission control or the application control, wherein the admission control controls terminal access to the network based on a value of the control label, and wherein the application control controls application access to the network based on the value of the control label.

7. The network device of claim 6, wherein the network device is a firewall device, and wherein the processor is further configured to perform the admission control and the application control on the service data flow using the admission control configuration information and the application control configuration information, respectively, when the control label is first information, and wherein the first information indicates that a receiver of the service data flow has not performed the admission control or the application control on the service data flow.

8. The network device of claim 7, wherein the processor is further configured to:
update the first information to fourth information after performing the admission control and the application control on the service data flow using the admission control configuration information and the application control configuration information, respectively; and forward the service data flow to a destination.

9. The network device of claim 6, wherein the network device is a switch, and wherein the processor is further configured to:
perform the admission control on the service data flow using the admission control configuration information when the control label is first information, wherein the first information indicates that a receiver of the service data flow has not performed the admission control or the application control on the service data flow;
update the first information to second information after performing the admission control on the service data flow; and
forward the service data flow to a destination.

10. The network device of claim 6, wherein the network device is a switch, and wherein the processor is further configured to keep fourth information unchanged during forwarding the service data flow directly to a destination when the control label is the fourth information.

11. The method of claim 1, wherein the network device is a firewall device, and wherein performing the network access control on the service data flow according to the control label comprises directly forwarding the service data flow to a destination when the control label is fourth information, wherein the fourth information indicates that a receiver of the service data flow has completed admission control and application control on the service data flow.

12. The method of claim 1, wherein the network device is a firewall device, and wherein performing the network access control on the service data flow according to the control label comprises:
performing the application control on the service data flow only using the application control configuration information when the control label is second information, wherein the second information indicates that the receiver of the service data flow has completed the admission control on the service data flow, but has not performed the application control on the service data flow;
updating the second information to fourth information after performing the application control on the service data flow; and
forwarding the service data flow to a destination.

13. The method of claim 1, wherein the network device is a firewall device, and wherein performing the network access control on the service data flow according to the control label comprises:
performing the admission control on the service data flow only using the admission control configuration information when the control label is third information, wherein the third information indicates that the receiver of the service data flow has completed the application control on the service data flow, but has not performed the admission control on the service data flow;
updating the third information to fourth information after performing the admission control on the service data flow; and
forwarding the service data flow to a destination.

14. The method of claim 1, wherein the network device is a switching device, and wherein performing the network access control on the service data flow comprises:
directly forwarding the service data flow to a destination when the control label is a second information, wherein the second information indicates that the receiver of the service data flow has completed the admission control on the service data flow, but has not performed the application control on the service data flow; and
keeping the second information unchanged during forwarding the service data flow directly to the destination.

15. The method of claim 1, wherein the network device is a switching device, and wherein performing the network access control on the service data flow comprises:
performing the admission control on the service data flow using the admission control configuration information when the control label is third information, wherein the third information indicates that the receiver of the service data flow has completed the application control on the service data flow, but has not performed the admission control on the service data flow;
updating the third information to fourth information after performing the admission control on the service data flow; and
forwarding the service data flow to a destination.

16. The network device of claim 6, wherein the network device is a firewall device, and wherein performing the network access control on the service data flow comprises directly forwarding the service data flow to a destination when the control label is a fourth information, wherein the fourth information indicates that a receiver of the service data flow has completed admission control and application control on the service data flow.

17. The network device of claim 6, wherein the network device is a firewall device, and wherein performing the network access control on the service data flow comprises:
performing the application control on the service data flow only using the application control configuration information when the control label is a second information, wherein the second information indicates that the receiver of the service data flow has completed the admission control on the service data flow, but has not performed the application control on the service data flow;
updating the second information to fourth information after performing the application control on the service data flow; and
forwarding the service data flow to a destination.

18. The network device of claim 6, wherein the network device is a firewall device, and wherein performing the network access control on the service data flow comprises:
performing the admission control on the service data flow only using the admission control configuration information when the control label is third information, wherein the third information indicates that the receiver of the service data flow has completed the application control on the service data flow, but has not performed the admission control on the service data flow;
updating the third information to fourth information after performing the admission control on the service data flow; and
forwarding the service data flow to a destination.

19. The network device of claim 6, wherein the network device is a switching device, and wherein performing the network access control on the service data flow comprises:
directly forwarding the service data flow to a destination when the control label is second information, wherein the second information indicates that the receiver of the service data flow has completed the admission control on the service data flow, but has not performed the application control on the service data flow; and keeping the second information unchanged during forwarding the service data flow directly to the destination.

20. The network device according to of claim 6, wherein the network device is a switching device, and wherein performing the network access control on the service data flow comprises:
  performing the admission control on the service data flow using the admission control configuration information when the control label is third information, wherein the third information indicates that the receiver of the service data flow has completed the application control on the service data flow, but has not performed the admission control on the service data flow;
  updating the third information to fourth information after performing the admission control on the service data flow using the admission control configuration information; and
  forwarding the service data flow to a destination.

* * * * *